US 6,826,921 B1

(12) United States Patent
Uselton

(10) Patent No.: US 6,826,921 B1
(45) Date of Patent: Dec. 7, 2004

(54) AIR CONDITIONING SYSTEM WITH VARIABLE CONDENSER REHEAT FOR ENHANCED DEHUMIDIFICATION

(75) Inventor: Robert B. Uselton, Plano, TX (US)

(73) Assignee: Lennox Industries, Inc., Richardson, TX (US)

( * ) Notice: Subject to any disclaimer, the term of this patent is extended or adjusted under 35 U.S.C. 154(b) by 0 days.

(21) Appl. No.: 10/613,267

(22) Filed: Jul. 3, 2003

(51) Int. Cl.[7] ............................. F25B 49/00; F25D 17/04
(52) U.S. Cl. .......................... 62/176.6; 62/160; 62/173; 62/176.5
(58) Field of Search .................... 62/176.6, 176.5, 62/181, 183, 184, 173, 90, 160

(56) References Cited

U.S. PATENT DOCUMENTS

| | | | |
|---|---|---|---|
| 3,139,735 A | * | 7/1964 | Malkoff et al. ............... 62/173 |
| 3,264,840 A | * | 8/1966 | Harnish ........................ 62/173 |
| 3,798,920 A | | 3/1974 | Morgan |
| 5,065,586 A | | 11/1991 | Shapiro-Baruch |
| 5,088,295 A | | 2/1992 | Shapiro-Baruch |
| 5,345,776 A | * | 9/1994 | Komazaki et al. ......... 62/176.3 |
| 5,622,057 A | | 4/1997 | Bussjager et al. |
| 5,706,664 A | * | 1/1998 | Hara ........................... 62/159 |
| 6,055,818 A | * | 5/2000 | Valle et al. ................... 62/173 |
| 6,212,892 B1 | | 4/2001 | Rafalovich |

* cited by examiner

*Primary Examiner*—Marc Norman
(74) *Attorney, Agent, or Firm*—Gardere Wynne Sewell, LLP

(57) ABSTRACT

A vapor compression air conditioning system, including a heat pump embodiment, provides enhanced dehumidification of supply air to an enclosed space. The refrigerant fluid circuit includes an evaporator and a reheat heat exchanger for controlling temperature and dehumidification of supply air. A variable speed fan motor controls air flow over an outdoor condenser heat exchanger whereby condenser heat exchange may be shifted progressively between the reheat heat exchanger and the condenser heat exchanger. One alternate embodiment includes a thermosiphon system for heat transfer to and from the reheat heat exchanger. Another embodiment includes a bypass air flow control damper for controlling flow of supply air through the evaporator and the reheat heat exchanger.

29 Claims, 6 Drawing Sheets

AIR CONDITIONING SYSTEM WITH VARIABLE CONDENSER REHEAT FOR ENHANCED DEHUMIDIFICATION

BACKGROUND

Vapor compression type air conditioning systems are well known and widely used for controlling temperature in residential and commercial applications. In addition to the sensible temperature within the space controlled by a vapor compression type air conditioning system, it is usually desirable to also control the absolute and relative humidity to enhance the comfort of occupants of the space or to meet other requirements of temperature and humidity within the space.

A type of vapor compression air conditioning system has been developed wherein an additional heat exchanger is placed in the supply air flowpath which furnishes condition air to the space being controlled so that, in addition to cooling the supply air to reduce the absolute humidity, the supply air is then reheated to a desired temperature for comfort and wherein the relative humidity is then also reduced for comfort and for meeting certain other requirements of the controlled space. However, known types of vapor compression air conditioning systems which include so-called condenser reheat, wherein the added heat exchanger mentioned above is disposed downstream of the evaporator or cooling type heat exchanger, are not capable of providing a suitably wide range of dehumidification of the controlled space.

Still further, in applications of vapor compression type air conditioning systems which function as so called heat pumps, to provide both heating and cooling effect to a controlled space, there has been the same need to provide enhanced dehumidification of the supply air to the controlled space. In accordance with the present invention, vapor compression air conditioning systems, including reversible or so called heat pump type systems, are provided with enhanced dehumidification capability.

SUMMARY OF THE INVENTION

The present invention provides an improved vapor compression type air conditioning system which is capable of providing a wide range of dehumidification of supply air which is conditioned and directed to a controlled space.

In accordance with one important aspect of the present invention, a vapor compression type air conditioning system is provided which includes a conventional evaporator or cooling heat exchanger together with a second heat exchanger disposed downstream, with respect to the direction of flow of supply air, for reheating the supply air to provide air to a controlled space at a desired temperature and relative humidity. A system in accordance with the invention is capable of providing supply air to a controlled space wherein the sensible to total cooling ratio of the system can be varied over a wide range. Moreover, the system of the invention may be arranged such that only two conduits are required for interconnecting the so called indoor heat exchangers with a compressor and primary condenser unit which are disposed "outdoors."

In accordance with another aspect of the present invention, an air conditioning system with enhanced dehumidification of supply air to a controlled space is provided wherein heat exchange by the primary condenser for the system is varied in accordance with the amount of heat exchange required by a supply air reheat heat exchanger which is disposed downstream of the system supply air cooling heat exchanger or evaporator. In a preferred embodiment, a variable speed fan is operable to control heat exchange between ambient air and refrigerant fluid flowing through the primary condenser heat exchanger. Still further, operation of the primary condenser heat exchanger is enhanced by allowing refrigerant fluid to bypass the primary condenser heat exchanger under certain operating conditions.

In accordance with yet a further aspect of the present invention, a vapor compression type air conditioning system is provided with at least some of the inventive features described above and which is also operable as a heat pump.

The above-mentioned advantages and superior features of the invention together with other important aspects thereof will be further appreciated by those skilled in the art upon reading the detailed description which follows in conjunction with the drawings.

DETAILED DESCRIPTION OF THE PREFERRED EMBODIMENTS

Figure 1:
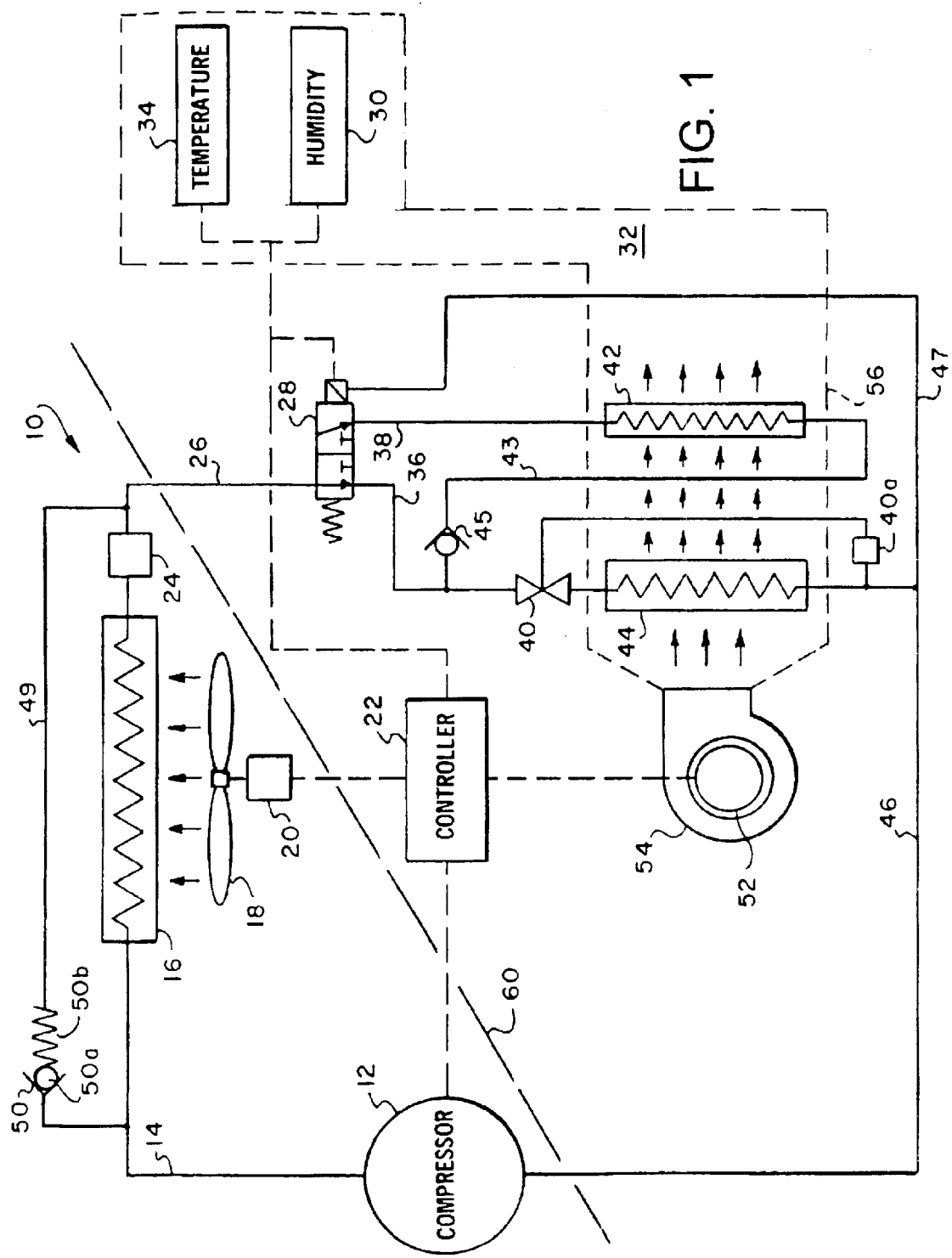
FIG. 1 is a schematic diagram of one preferred embodiment of an air conditioning system in accordance with the invention.

In the description which follows like parts are marked throughout the specification and drawing with the same reference numerals, respectively. The drawing figures are schematic diagrams in the interest of clarity and conciseness. Certain components, such as valves, are shown in functional form only.

Referring to FIG. 1, there is illustrated a schematic diagram of one preferred embodiment of the present invention comprising a vapor compression type air conditioning system with enhanced dehumidification capability and generally designated by the numeral 10. The system 10 comprises a conventional electric motor driven compressor 12 connected via a conduit 14 to a heat exchanger 16 disposed "outdoors", typically, and comprising a refrigerant fluid primary condenser. In the embodiment illustrated in FIG. 1, heat exchange between fluid flowing through the condenser heat exchanger 16 and ambient air is controlled by a fan 18 having plural fixed pitch blades 18a and which is driven by a variable speed electric motor 20. Electric motor 20 may be an electrically commutated type operating on variable frequency and voltage AC electric power as supplied to the motor via a suitable controller 22. Fan 18 propels a heat exchange medium, such as ambient "outdoor" air through condenser heat exchanger 16 in a known manner. Condenser heat exchanger 16 may also operate with other forms of heat exchange medium at controlled flow rates thereof. Control of heat exchange medium flowing over condenser heat exchanger 16 may take other forms such as a constant speed variable pitch fan, air flow control louvers, or control of a variable flow of a liquid heat exchange medium. Condenser heat exchanger 16 is also operably connected to a conventional refrigerant fluid filter and dryer 24 disposed in a conduit 26 for conducting condensed refrigerant fluid to a power operated or so called motor controlled valve 28. Valve 28 may be controlled by a solenoid operator, for example, and may be of a type commercially available. The solenoid operator for the valve 28 is also adapted to be controlled by a suitable humidity sensor 30 disposed in a space 32 to be conditioned by the system 10. The humidity sensor 30 is also operably connected to controller 22. A temperature sensor 34, disposed within the conditioned space 32, is also operably connected to the controller 22. Controlled and conditioned space 32 is represented only schematically in the drawing figures and a return air path from space 32 or another source of air to be conditioned is omitted in the interest of conciseness.

Referring further to FIG. 1, conduit 26 is connected by way of valve 28 to further refrigerant conducting conduits 36 and 38 to a conventional refrigerant fluid expansion device 40 and to a heat exchanger 42, respectively. Conduit 36 is operable to deliver refrigerant fluid to a heat exchanger or so called evaporator 44 by way of the expansion device 40. Expansion device 40 includes a remote temperature sensor 40a which is adapted to sense the temperature of refrigerant fluid leaving the heat exchanger 44 by way of a conduit 46. Conduit 46 is commonly known as the suction line leading to compressor 12 whereby refrigerant fluid in vapor form is compressed and recirculated through the system 10 by way of condenser heat exchanger 16. A suitable valve operator vent conduit 47 is connected between valve 28 and conduit 46. Heat exchangers 16, 42 and 44 may be conventional multiple fin and tube type devices, for example.

Heat exchanger or so called reheat condenser 42 is adapted to receive refrigerant fluid through conduit 38 and discharge such fluid through a conduit 43 and a check valve 45 to conduit 36 upstream of expansion device 40, as illustrated in FIG. 1. Referring further to FIG. 1, under certain operating conditions refrigerant fluid may also be advantageously permitted to bypass the condenser heat exchanger 16 through a conduit 49 and a pressure relief valve 50. Pressure relief valve 50 includes a closure member 50a which is biased into a valve closed position by resilient means, such as a coil spring 50b. In response to a predetermined pressure or range of pressures acting on the closure member, the pressure relief valve 50 is operable to bypass fluid flowing through conduit 14 around the condenser heat exchanger 16 directly to conduit 26 downstream of the filter/dryer 24, as illustrated in FIG. 1.

In the operation of the air conditioning system 10, controller 22 is operable to control a drive motor 52 for a supply air blower or fan 54 of a conventional type. Ambient outdoor air or air being circulated as return air from space 32 is propelled by motor driven blower 54 through a suitable duct 56 in which the heat exchangers 42 and 44 are disposed and wherein heat exchanger 42 is downstream of heat exchanger 44. Those skilled in the art will recognize that the system 10 includes elements of a conventional vapor compression air conditioning system wherein compressor 12 compresses a suitable refrigerant fluid which is condensed in condenser heat exchanger 16 and is conducted to heat exchanger or evaporator 44 through control or expansion device 40 wherein the condensed refrigerant fluid is expanded and absorbs heat from the air flowing through the duct 56 to provide cooled air to space 32, as demanded by temperature sensor 34 acting through controller 22. Controller 22 is operable to control fan motor 52 as well as motor driven compressor 12 and the variable speed fan motor 20 which controls the amount of cooling air flowing over condenser heat exchanger 16.

If the relative humidity requirements of the space 32 are not being met by operation of the system 10 wherein all refrigerant fluid is being directed from conduit 26 directly to conduit 36, control valve 28 will be actuated to force refrigerant fluid to and through heat exchanger 42 giving up heat to air flowing through the duct 56 into the space 32 thereby raising the temperature of such air and effectively reducing the relative humidity. Since refrigerant fluid condensed and further cooled in the heat exchanger or condenser 42 then flows via conduit 43 to expansion device 40 and heat exchanger or evaporator 44, substantial cooling effect is imparted to air being discharged by blower 54 and flowing through heat exchanger or evaporator 44 to thereby condense moisture in the air flowing through duct 56. Accordingly, air propelled by blower 54 is first cooled by heat exchanger 44 to condense moisture therein and is then reheated by heat exchanger 42 to meet the temperature and humidity requirements of the space 32. If the humidity requirements of space 32 are not being met by the aforementioned operation of system 10, the controller 22 is commanded to reduce the speed of the fan motor 20 and fan 18, thereby reducing the heat exchange taking place by air flow through the condenser heat exchanger 16. Fan motor 20 may be controlled to continuously vary the speed of fan 18 or motor output speed may be varied in discrete steps. In this way a greater heat rejection load is placed on heat exchanger or so called reheat condenser 42, progressively, thus raising the temperature of the air flowing into space 32 to further reduce the relative humidity.

In those circumstances where the reduced exchange of heat at the condenser heat exchanger 16 occurs, the configuration of the condenser heat exchanger 16 may be such as to impose a relatively large fluid pressure drop thereacross for refrigerant fluid flowing therethrough, particularly if a substantial amount of such fluid is remaining in gaseous form. However, since a greater amount of condensation is occurring in heat exchanger 42, as the fluid condensing load is shifted from heat exchanger 16 to heat exchanger 42, refrigerant fluid in gaseous form may bypass heat exchanger 16 by way of pressure relief valve 50 and conduit 49 without degrading the performance of the system 10.

Another advantage of the system 10 is that only two refrigerant fluid conduits are required to extend between the indoor portion of the system 10, as indicated by the dashed line 60 in FIG. 1, wherein the indoor portion is that generally below the line as shown in the drawing figure. The so called outdoor portion of system 10 typically includes the compressor 12 and the condenser heat exchanger 16 as well as the condenser fan and motor 18, 20. In other words only conduits 26 and 46 and control wiring for compressor 12 and motor 20 are required to extend between the indoor part of the system and the outdoor part as separated by line 60. This improved arrangement provides for retrofitting of certain air conditioning systems since the outdoor portion of an existing system may be unaffected by replacing the original indoor portion of the existing system with the indoor portion of system 10, for example.

Figure 2:
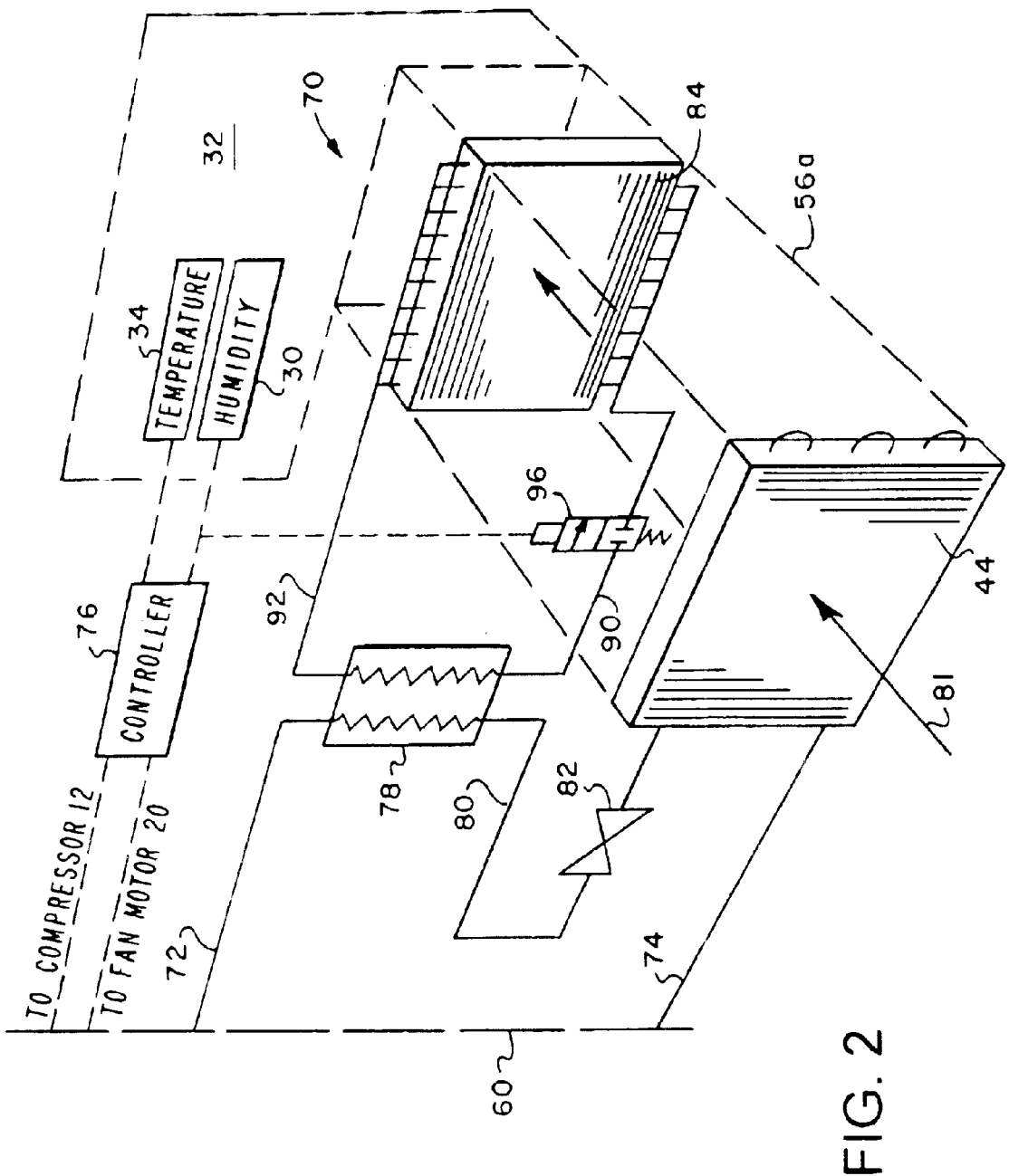
FIG. 2 is a schematic diagram of a first alternate embodiment of an air conditioning system in accordance with the invention.

Referring to FIG. 2 there is illustrated a first alternate embodiment of a system in accordance with the invention and generally designated by the numeral 70. The system 70 includes all of the components of the outdoor portion of the system 10, not shown in FIG. 2, and which would be disposed to the left of line 60, as shown in FIG. 2. In other words by connecting that portion of the system shown in FIG. 2 to that portion of the system shown in FIG. 1 above the line 60 in FIG. 1 conduit 26 would be connected to a refrigerant conduit 72 in FIG. 2 and conduit 46 would be connected to a refrigerant return conduit 74 in FIG. 2. A controller 76 for system 70 is also operable to control operation of the compressor for the system 70 (compressor 12 of FIG. 1) as well as the variable speed fan 18 via motor 20.

However, referring further to FIG. 2, refrigerant fluid from the outdoor condenser heat exchanger flowing through conduit 72 is conducted to a further heat exchanger 78 which may be a relatively low internal volume or so called plate type heat exchanger. Refrigerant fluid leaving heat exchanger 78 is conducted via conduit 80 to an expansion device 82 similar to expansion device 40. Air conditioning system 70 also includes an evaporator heat exchanger 44 for receiving refrigerant fluid from conduit 80 by way of expansion device 82 and for discharging refrigerant fluid in substantially vapor form via conduit 74. Heat exchanger or evaporator 44 is disposed in a duct 56a similar to duct 56 whereby air to be conditioned is propelled by a suitable blower, not shown in FIG. 2, in the direction of arrow 81 through the heat exchanger 44 and then through a suitable reheat heat exchanger 84 disposed in duct 56a downstream of heat exchanger 44 for discharging conditioned air into controlled space 32 in which the sensors 30 and 34 are disposed.

Unlike the system of FIG. 1, the system 70 includes a thermosiphon or heat pipe type air reheating apparatus including the heat exchanger 84, and conduits 90 and 92, FIG. 2, which are also connected to the heat exchanger 78. A suitable refrigerant fluid charge is provided in the closed circuit for heat exchanger 84, conduits 90, 92 and heat exchanger 78 for receiving heat therefrom and given up by refrigerant fluid flowing from conduit 72 to conduit 80 via the heat exchanger 78.

The system 70 operates substantially like the system 10 with respect to operation when temperature and humidity demands, as set by the sensors 34 and 30, are communicated to the controller 76. An advantage of the system 70 is that the refrigerant fluid charge differential needed between the two modes of operation described above can be minimized and the valving required is less complicated. Under normal operating conditions a solenoid valve 96, FIG. 2, is closed and all refrigerant fluid condensing is done within the outdoor condenser heat exchanger 16, not shown in FIG. 2. When a reduced sensible cooling capacity is desired valve 96 is opened and the speed of fan motor 20 is reduced and the thermosiphon heat exchange loop provided by the heat exchangers 78 and 84, the conduits 90 and 92 and a suitable refrigerant fluid circulated therewithin will provide condensing of the refrigerant fluid flowing from conduit 72 to conduit 80 while also providing reheat to air flowing through heat exchanger 84 to reduce the relative humidity in space 32.

Figure 3:
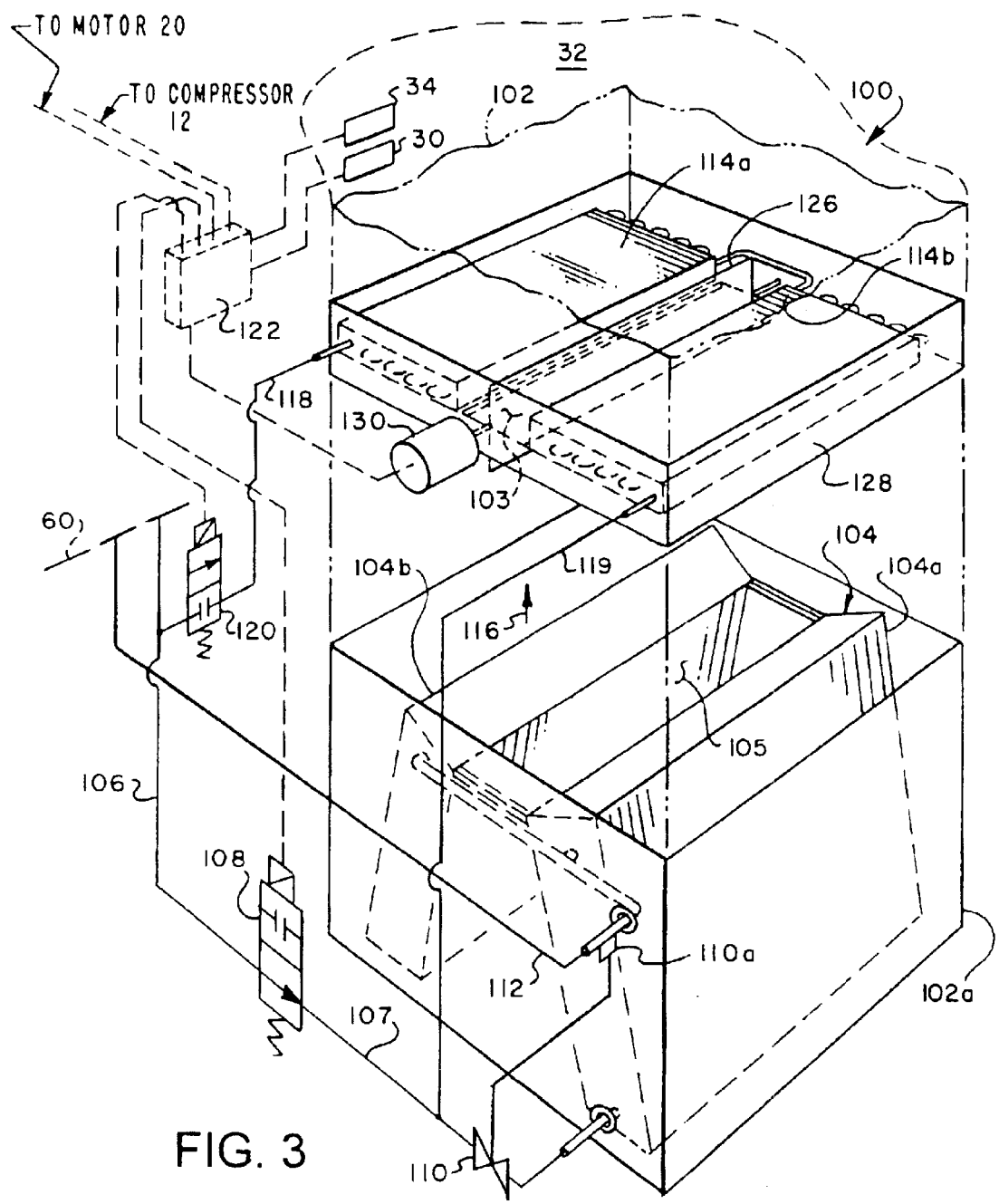
FIG. 3 is a schematic diagram of a second alternate embodiment of an air conditioning system in accordance with the invention.

Referring now to FIG. 3, another embodiment of a system in accordance with the present invention is illustrated and generally designated by the numeral 100. The air conditioning system 100 comprises all of the outdoor components of the embodiments of FIGS. 1 and 2. Accordingly, only the so called indoor components on the indoor side of line 60 are illustrated in FIG. 3 and comprise a duct 102 in which a conventional dual unit "A" frame type evaporator coil or heat exchanger 104 is disposed and is connected to a high pressure refrigerant fluid conduit 106, 107. Evaporator heat exchanger 104 includes opposed evaporator units 104a and 104b spaced apart to provide an opening 105 therebetween. Conduit 106 is connected to the conduit 26 of the outdoor components shown in FIG. 1. Conduit 106, 107 has a normally open solenoid operated valve 108 interposed therein as well as a refrigerant fluid expansion device or valve 110. Expansion device 110 includes a temperature sensor 110a for sensing the temperature of refrigerant fluid leaving the evaporator heat exchanger 104 via a conduit 112. Conduit 112 is adapted to be operably connected to conduit 46 leading to compressor 12 of the outdoor section of FIG. 1, but not shown in FIG. 3.

Also disposed in duct 102, is a second heat exchanger arrangement including series connected heat exchanger units 114a and 114b disposed in duct 102 downstream in the direction of the flow of air through the duct from heat exchanger 104, as indicated by the arrow 116 in FIG. 3. Series connected heat exchangers 114a and 114b are connected to conduit 106 by way of a conduit 118 having a normally closed solenoid operated valve 120 disposed therein. Valves 108 and 120 are operably controlled by a controller 122, similar to controller 22, which is also connected to the temperature sensor 34 and humidity sensor 30 in the same manner as the controllers 22 and 76 whereby the sensors 30 and 34 sense air within a space 32 which receives supply air via the duct 102 and the heat exchangers 104 and 114a, 114b. A blower or fan 54, as shown in FIG. 1, may be used with system 100 to circulate supply air through duct 102 to space 32. Air is circulated through the evaporator or heat exchanger 104 and then through heat exchangers 114a and 114b within the duct 102 by the aforementioned motor driven blower or fan.

In the embodiment of FIG. 3, a space 103 within duct 102 is provided between the heat exchangers 114a and 114b within which space is disposed a rotary, rectangular plate, damper 126 operably supported for rotation on a peripheral box-like frame member 128 which also supports the heat exchangers 114a and 114b and fits within, or may form part of, the duct 102. In FIG. 3, member 128 is shown displaced from a lower portion 102a of duct 102 in an exploded perspective form of illustration. However, in assembly, member 128 is disposed directly over and adjacent to evaporator 104. Accordingly, damper 126 is also adapted to be disposed substantially in and control air flow through the opening 105 as well as the space 103. A suitable rotary motor actuator 130 is operably connected to the damper 126 and to the controller 122 whereby, during operation of the system 100, supply air may flow through the evaporator heat exchanger 104 and then through the heat exchangers 114a and 114b in its entirety or, depending on the position of the damper 126, at least some of the supply air flowing through the duct 102 may bypass the heat exchangers 104, 114a and 114b by flowing through the opening 105 and the space 103, as controlled by the position of the damper.

When the temperature sensor 34 and humidity sensor 30 reach respective setpoints requiring operation of the system 100, in a mode other than the normal air cooling mode, valve 108 is closed and valve 120 is opened whereby refrigerant fluid from condenser 16 of the outdoor unit, not shown in FIG. 3, flows through conduit 106 and conduit 118 then through heat exchangers 114a and 114b and then via conduit 119 to conduit 107 and expansion device 110. In this respect the system 100 operates substantially like the system 10. However, at least part of the supply air flowing through duct 102 may bypass the heat exchangers 104, 114a and 114b by selectively positioning the rotary damper 126 to allow such bypass operation. Moreover, the system 100 may be configured, as a result of modifying a conventional vapor compression type air conditioning system, by installing the heat exchangers 114a, 114b and damper 126 as an add-on unit, by modifying the conduits leading to and from the outdoor unit to include the solenoid operated valves 108 and 120 as well as the connections to conduits 118 and 119. This modification may be relatively easily done without substantial re-working of a conventional vapor compression air conditioning system. Still further, the system 100 enjoys the benefits of the systems 10 and 70 in that there is no requirement to run additional refrigerant lines to the outdoor part of the system.

Figure 4:
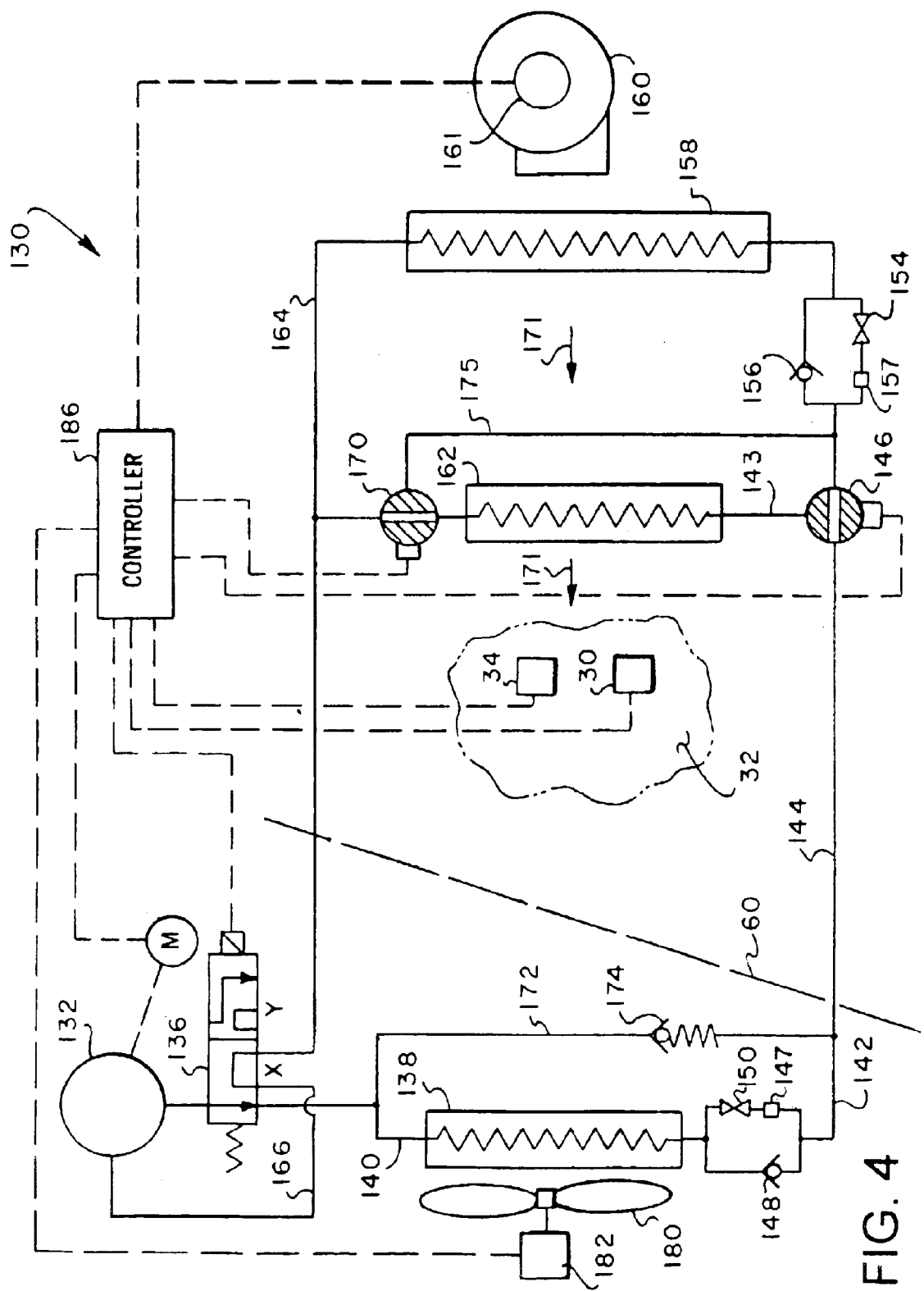
FIG. 4 is a schematic diagram of a so-called heat pump type air conditioning system in accordance with the invention.

Referring now to FIG. 4, there is illustrated yet another preferred embodiment of an air conditioning system in accordance with the invention and generally designated by the numeral 130. The system 130 comprises a vapor compression type air conditioning system which is also operable in a reverse or so-called heat pump mode. Dashed line 60 divides the outdoor components of the system from the indoor components for conditioning air within a space 32. The outdoor part of the system 130 includes a motor driven compressor 132 operably connected to a remotely controllable system reversing valve 136. A condenser heat exchanger 138 is operably connected to valve 136 via a conduit 140 for receiving high pressure refrigerant fluid from compressor 132 by way of reversing valve 136 when valve 136 is in its position x. Condensed high pressure fluid flows via a conduit 142 to a conduit 144 leading to a motor operated valve 146.

A conventional arrangement for heat pumps of a filter/dryer 147, check valve 148 and expansion device 150 is interposed heat exchanger 138 and conduit 142. In like manner a conventional arrangement of an expansion device 154, a check valve 156 and a filter/dryer 157 is operable to be connected to conduit 144 via valve 146. An indoor heat exchanger or evaporator 158 receives refrigerant fluid from the conduit 144 and valve 146 as well as expansion device 154 whereby cooling effect of air being pumped by a blower 160 to the space 32 is provided as heat exchange takes place through the heat exchanger 158. Heat exchanger 158, as well as a reheat heat exchanger 162, may be disposed in suitable ductwork, not shown, for conducting supply air from blower 160 to space 32. A return air circuit or other source of supply air to blower 160 is omitted from FIG. 4, as with the other drawing figures. Refrigerant fluid exiting the evaporator heat exchanger 158 flows through a conduit 164 to the reversing valve 136. The position x of the reversing valve 136 in the so-called normal cooling mode of the space 32 causes refrigerant fluid in vapor form to flow through a conduit 166 from valve 136 to the compressor 132. As mentioned previously, compressed refrigerant fluid discharged from the compressor 132 flows through valve 136 to conduit 140.

A second solenoid or motor controlled valve 170 is operably connected to conduit 164, a conduit 175 and heat exchanger 162, as shown in FIG. 4. Still further, the system 130 may include a bypass conduit 172 and pressure relief valve 174 for bypassing fluid around heat exchanger 138 from conduit 140 to conduit 142. Heat exchange takes place at the heat exchanger or condenser 138 by flow of ambient outdoor air through the heat exchanger as propelled by a variable speed motor driven fan including fan blade or propeller 180 drivingly connected to a variable speed motor 182, substantially like motor 20. A controller 186 receives signals from humidity sensor 30 and temperature sensor 34 for controlling compressor motor 134, fan motor 182 and a motor 161 for driving blower 160. Controller 186 also controls the positions of the valves 146 and 170. Valve 146 is operable to conduct fluid from conduit 142 via a conduit 143 directly to heat exchanger 162 which is located downstream with respect to the direction of airflow or supply air from blower 160 to space 32, as indicated by the arrow 171 in FIG. 4. Valve 170 is operable to communicate fluid from heat exchanger 162 to conduit 164 or to conduit 175 which, as shown, is connected to conduit 144 between valve 146 and expansion device 154.

In operation of the system 130 in the normal cooling mode for providing cooled conditioned air to the space 32, the controller 186 will call for operation of the compressor 132, the blower motor 161 and the fan motor 182 to operate the system 130 in the normal cooling mode, that is with high pressure refrigerant vapor being discharged from compressor 132 to flow through condenser heat exchanger 138, then through conduit 142, 144, valve 146 and expansion device 154, and through heat exchanger 158 to absorb heat from air being blown through the heat exchanger by blower 160. Valve 146 is in the position shown in FIG. 4 and valve 170 is in the position shown, which essentially isolates heat exchanger 162 since no refrigerant fluid flow occurs therethrough. Low pressure refrigerant fluid in vapor form is returned to compressor 132 via conduit 164, reversing valve 136 and conduit 166.

Figure 5:
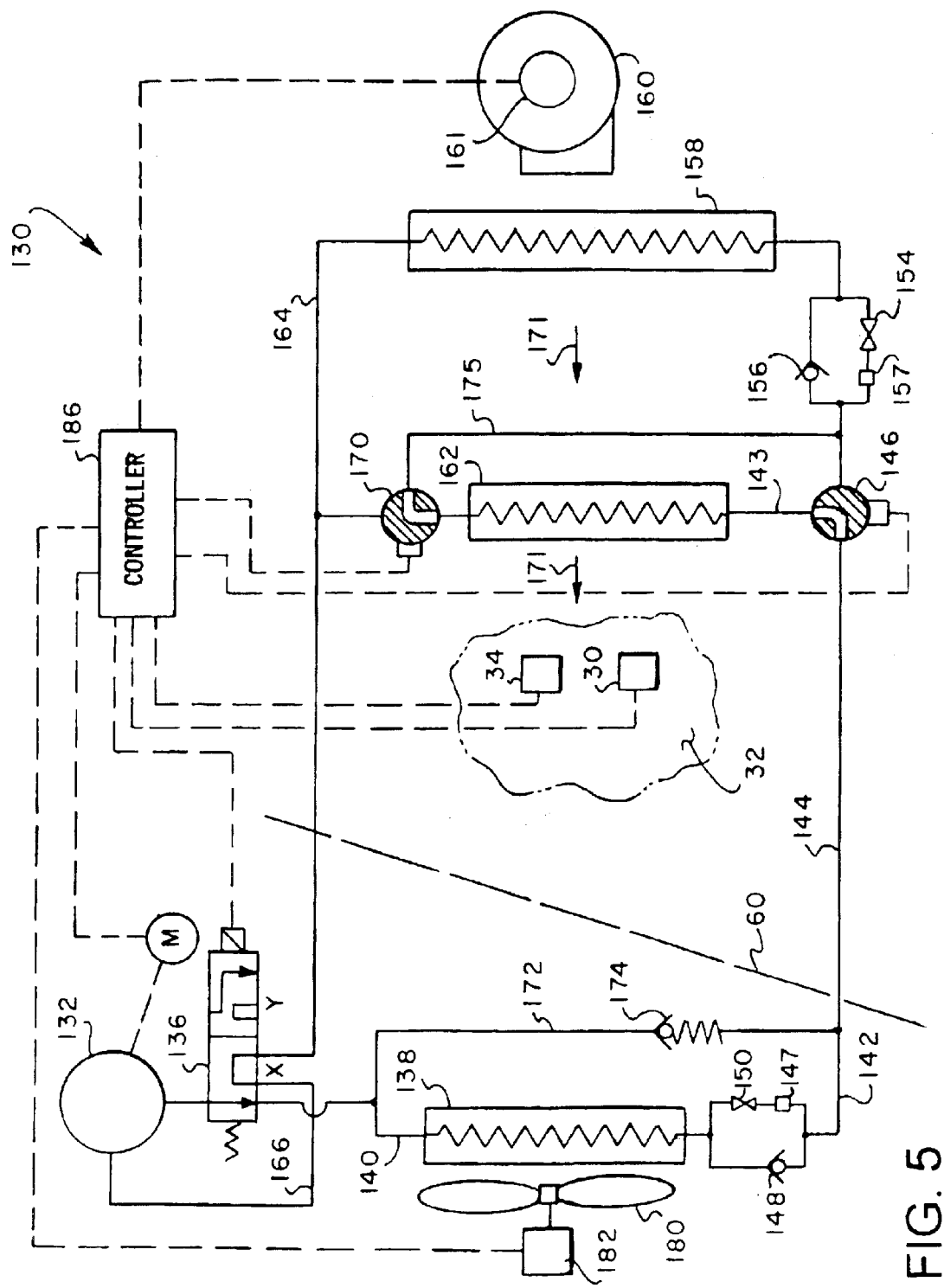
FIG. 5 is a schematic diagram of the system shown in FIG. 4 with the reheat heat exchanger operable.

When enhanced dehumidification is required of the system 130, it assumes the operating condition shown in FIG. 5 wherein compressor 132 still delivers high pressure refrigerant fluid vapor to condenser heat exchanger 138 since valve 136 remains in position x. Partially condensed refrigerant fluid flows from heat exchanger 138 through conduit 142, 144 and valve 146, now in a position to conduct refrigerant fluid, partially or completely condensed, through heat exchanger 162 to exchange heat with air flowing to the space 32 via the blower 160 and the heat exchanger 158. Further cooled refrigerant fluid flows through valve 170, in its position as shown in FIG. 5, and through conduit 175 and expansion device 154 before absorbing heat from air flowing through heat exchanger or evaporator 158. In this operating mode enhanced dehumidification of air occurs in the same way that the system 10 operates, for example. As controller 186 receives signals from the humidity sensor 30 requiring even lower relative humidity the fan motor 182 is operable to reduce the speed of fan 180 to reduce the heat exchange taking place at condenser heat exchanger 138 and placing a greater condensing burden on the heat exchanger 162.

Referring further to FIG. 5, since the system 130 is operable as a heat pump, the diagram of FIG. 5 also shows the condition of valves 146 and 170 in the heating mode of operation. In this mode heated refrigerant fluid is discharged from compressor 132 as a gas, flows through reversing valve 136, which in the heating mode would be shifted to its position y, to cause compressed and heated refrigerant fluid to flow from compressor 132 through conduit 164 to heat exchanger 158 and then via check valve 156 to conduit 175, valve 170, heat exchanger 162, valve 146 and conduit 142, 144, then through expansion device 150 and heat exchanger 138 before returning to reversing valve 136. With valve 136 in its position y, low pressure refrigerant fluid in gas or vapor form flows through conduit 140, valve 136 and conduit 166 and returns to compressor 132. Thanks to the provision of the so-called reheat condenser heat exchanger 162, enhanced heating of the space 32 is provided in the heating mode of operation of the system 130. Thus additional benefits are provided by the system 130 operating as a heat pump as well as when operating to provide enhanced dehumidification of the conditioned space 32.

With the system 130 in the so-called cooling mode, as shown in FIG. 4, valve 146 directs all refrigerant fluid flow to the expansion device 154 and the heat exchanger 158 and with the valve 136 in position to allow flow of fluid through conduit 164 to the inlet or suction side of compressor 132, the compressor will also withdraw liquid refrigerant from the heat exchanger 162 while it is inactive, thanks to the position of valve 170 shown.

When the valves 146 and 170 are positioned as shown in FIG. 5, partially condensed refrigerant fluid from the heat exchanger 138 flows through heat exchanger 162 before going through the expansion device 154 and evaporator or heat exchanger 158 and the fan motor 182 is also operable to reduce the speed of fan 180, as required by the controller 186 and sensor 30, to a point where there is no longer complete condensation of refrigerant fluid in the heat exchanger 138. Pressure relief valve 174 will allow bypass of compressor discharge gas around the heat exchanger 138 when a pressure differential across the heat exchanger 138 exceeds a predetermined level. Accordingly, energy efficient tempering of air being supplied to the space 32 is provided. In certain instances the pressure relief valve 174 may or may not be required.

Figure 6:
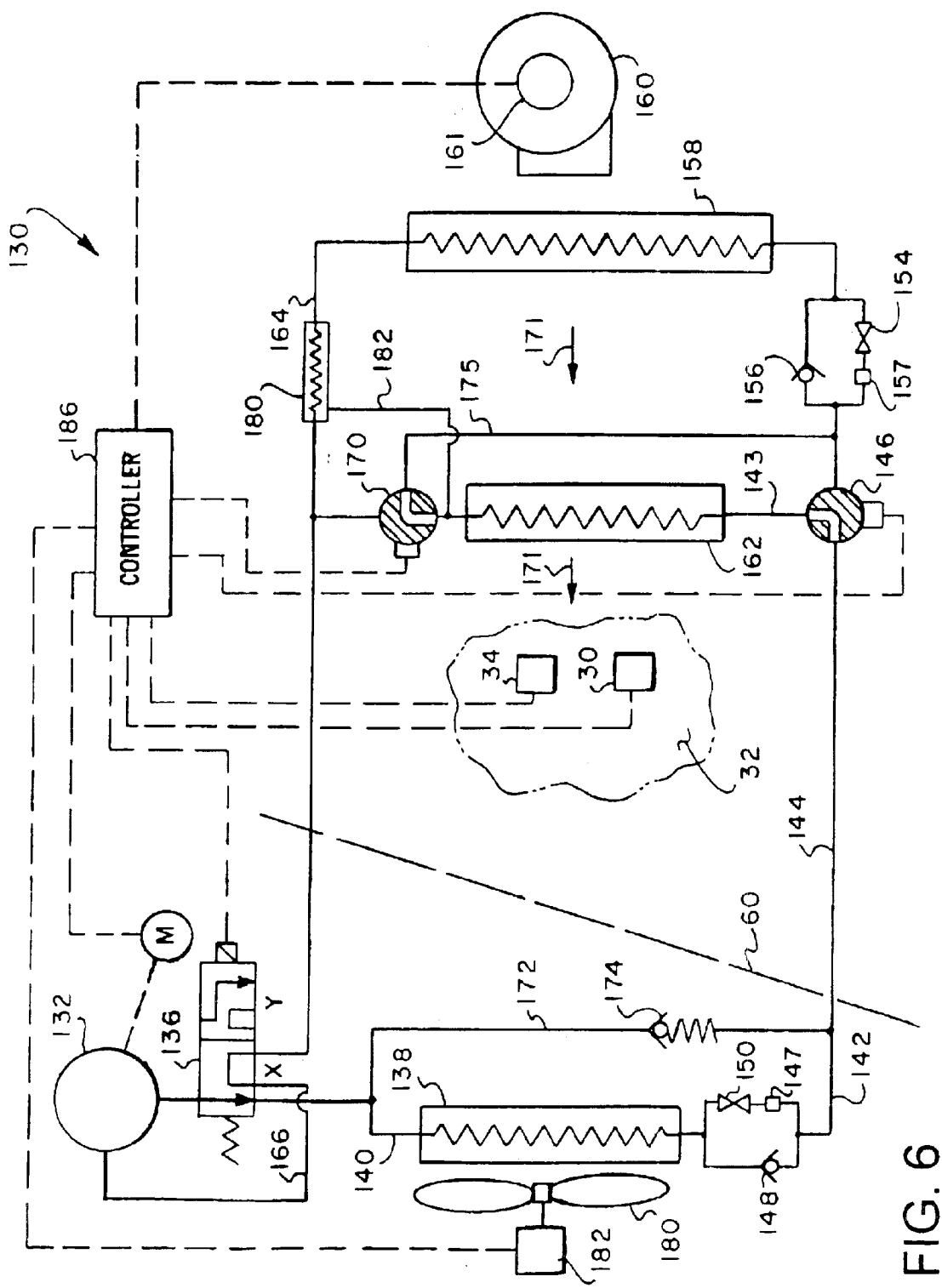
FIG. 6 is a schematic diagram of the system shown in FIG. 4 but modified to include a refrigerant fluid charge compensator.

Referring now to FIG. 6, a modification to the air conditioning system 130 is illustrated wherein a so called refrigerant fluid charge compensator 180 is connected to conduit 164 and to a branch conduit 182. Conduit 182 is connected to the refrigerant fluid path comprising that portion of conduit 175 between the heat exchanger 162 and the valve 170. Charge compensator 180 comprises a closed heat exchanger vessel which is operable to store refrigerant fluid, generally in liquid form, within the charge compensator under certain operating conditions wherein an excess refrigerant fluid charge in the system 130 would otherwise adversely affect operation thereof. For example, with the system 130 operating in the enhanced dehumidification mode, low temperature refrigerant fluid flowing through conduit 164 will exchange heat with and tend to condense refrigerant fluid flowing into charge compensator 180 from conduit 182 and the conductive path of fluid flowing through conduit 175, valve 170 and heat exchanger 162. Thus, some condensed refrigerant fluid will accumulate in the charge compensator 180 during this operating mode. When the system 130 is operating in the heating mode for heating the space 32, the refrigerant fluid charge will, normally, return to the active circuit described hereinbefore. Fluid charge compensator 180 may be of a type known in the art of vapor compression air conditioning systems.

Although preferred embodiments of the invention have been described in detail herein, those skilled in the art will appreciate that various substitutions and modifications may be made without departing from the scope and spirit of the appended claims.

What is claimed is:

1. A heat pump air conditioning system for controlling the temperature and humidity of supply air to an enclosed space, said system comprising:
   a refrigerant fluid circuit including a flow direction reversing valve, a compressor operable to conduct compressed refrigerant fluid vapor to a condenser heat exchanger, a reheat heat exchanger and an evaporator heat exchanger for circulating refrigerant fluid therethrough;
   a supply air blower for conducting supply air through said evaporator heat exchanger and said reheat heat exchanger to said enclosed space;
   a fluid expansion control device disposed in said circuit between said condenser heat exchanger and said evaporator heat exchanger;
   a first control valve disposed in said circuit between said expansion device and said condenser heat exchanger for selectively directing flow of refrigerant fluid to said evaporator heat exchanger or said reheat heat exchanger;
   a second control valve disposed in said circuit for selectively directing flow of refrigerant fluid from said reheat heat exchanger to a conduit in communication with said expansion device or from said reheat heat exchanger to a conduit extending between said evaporator heat exchanger and said reversing valve;
   temperature and humidity sensors for sensing the temperature and humidity of air in said enclosed space; and
   a controller operably connected to said sensors, said control valves and said reversing valve and operable for causing refrigerant fluid flow through said circuit in one operating condition of said control valves directly from said condenser heat exchanger through said evaporator heat exchanger and in another operating condition of said control valves from said condenser heat exchanger through said reheat heat exchanger and then through said evaporator heat exchanger.

2. The system set forth in claim 1 including:
   a bypass conduit in said circuit for bypassing refrigerant fluid around said condenser heat exchanger to a conduit of said circuit connected to said first control valve.

3. The system set forth in claim 2 including:
   a pressure relief valve disposed in said bypass conduit for controlling refrigerant fluid pressure at which fluid bypasses said condenser heat exchanger.

4. The system set forth in claim 1 including:
   a fluid expansion device disposed in said circuit between said first control valve and said condenser heat exchanger for throttling flow of refrigerant fluid during operation of said system as a heat pump.

5. The system set forth in claim 1 including:
   a refrigerant fluid charge compensator operably connected to said circuit for storing a portion of said refrigerant fluid.

6. The system set forth in claim 5 wherein:
   said refrigerant fluid charge compensator comprises a heat exchanger disposed in said circuit between said evaporator heat exchanger and said reversing valve and in fluid flow communication with refrigerant fluid in said reheat heat exchanger.

7. The system set forth in claim 1 including:
   means for controlling flow of a heat exchange medium in contact with said condenser heat exchanger for varying heat exchange with refrigerant fluid flowing through said condenser heat exchanger.

8. The system set forth in claim 7 wherein:
   said heat exchange medium is ambient air and said means for controlling is a variable speed fan.

9. A heat pump air conditioning system for controlling the temperature and humidity of supply air to an enclosed space, said system comprising:
   a refrigerant fluid circuit including a flow direction reversing valve, a compressor operable to conduct compressed refrigerant fluid vapor to a condenser heat exchanger, a reheat heat exchanger and an evaporator heat exchanger for circulating refrigerant fluid therethrough;

a supply air blower for conducting supply air through said evaporator heat exchanger and said reheat heat exchanger to said enclosed space;

a fluid expansion control device disposed in said circuit between said condenser heat exchanger and said evaporator heat exchanger;

a control valve disposed in said fluid circuit between said expansion device and said condenser heat exchanger for selectively directing flow of refrigerant fluid to said evaporator heat exchanger or said reheat heat exchanger;

a refrigerant fluid charge compensator operably connected to said circuit for storing a portion of said refrigerant fluid;

temperature and humidity sensors for sensing the temperature and humidity of air in said enclosed space; and a controller operably connected to said sensors, said control valve and said reversing valve and operable for causing refrigerant fluid flow through said circuit in one operating condition of said control valve directly from said condenser heat exchanger through said evaporator heat exchanger and in another operating condition of said control valve from said condenser heat exchanger through said reheat heat exchanger and then through said evaporator heat exchanger.

10. The system set forth in claim 9 including:
a bypass conduit in said circuit for bypassing refrigerant fluid around said condenser heat exchanger to a conduit of said circuit connected to said control valve.

11. The system set forth in claim 10 including:
a pressure relief valve disposed in said bypass conduit for controlling refrigerant fluid pressure at which fluid bypasses said condenser heat exchanger.

12. The system set forth in claim 9 including:
a fluid expansion device disposed in said circuit between said control valve and said condenser heat exchanger for throttling flow of refrigerant fluid during operation of said system as a heat pump.

13. The system set forth in claim 9 wherein:
said refrigerant fluid charge compensator comprises a heat exchanger disposed in said circuit between said evaporator heat exchanger and said reversing valve and in fluid flow communication with refrigerant fluid in said reheat heat exchanger.

14. An air conditioning system for conditioning supply air conducted to an enclosed space comprising:
a refrigerant fluid circuit including a condenser heat exchanger and an evaporator heat exchanger operably connected for circulating a refrigerant fluid;
a supply air reheat heat exchanger disposed downstream of said evaporator heat exchanger with respect to the direction of supply air flow through said evaporator heat exchanger and said reheat heat exchanger;
a control valve for selectively controlling refrigerant fluid to flow directly from said condenser heat exchanger to said evaporator heat exchanger and from said condenser heat exchanger to said reheat heat exchanger and then to said evaporator heat exchanger;
a blower for conducting supply air through said evaporator heat exchanger and said reheat heat exchanger to supply conditioned air to said space;
a humidity sensor for sensing the humidity in said enclosed space; and
a controller for controlling flow of heat exchange medium through said condenser heat exchanger whereby dehumidification of supply air flowing to said enclosed space may be controlled by the amount of heat exchange carried out by said reheat heat exchanger and said condenser heat exchanger, respectively.

15. The system set forth in claim 14 wherein:
said refrigerant fluid circuit includes a compressor for compressing refrigerant fluid discharged from said evaporator heat exchanger and for conduction to said condenser heat exchanger.

16. The system set forth in claim 14 wherein:
said heat exchange medium comprises air and said system includes a fan disposed for propelling air through said condenser heat exchanger.

17. The system set forth in claim 16 wherein:
said fan is driven at variable speed by a motor operably connected to said controller.

18. The system set forth in claim 14 including:
a damper for controlling the flow of supply air to provide for bypassing at least a portion of supply air around said evaporator heat exchanger and said reheat heat exchanger.

19. The system set forth in claim 18 including:
an actuator connected to said damper and to said controller for selectively controlling the amount of supply air flowing through said system to bypass said evaporator heat exchanger and said reheat heat exchanger.

20. The system set forth in claim 14 wherein:
said refrigerant circuit includes a flow reversing valve disposed between a compressor for compressing said refrigerant fluid, said condenser heat exchanger and said evaporator heat exchanger for selectively operating said system for cooling and dehumidifying said supply air and for heating said supply air, depending on the position of said reversing valve.

21. The system set forth in claim 14 including:
a further control valve in said refrigerant fluid circuit for controlling flow of refrigerant fluid from said reheat heat exchanger wherein in a first mode of operation of said system for cooling supply air flowing through said evaporator heat exchanger refrigerant fluid bypasses said reheat heat exchanger, and in a second mode of operation of said system for cooling and dehumidifying supply air refrigerant fluid is circulated from said condenser heat exchanger through said reheat heat exchanger and then through said evaporator heat exchanger.

22. The system set forth in claim 21 wherein:
said refrigerant fluid circuit includes a flow direction reversing valve and in a third mode of operation refrigerant fluid flows through said evaporator heat exchanger, then through said reheat heat exchanger and then through said condenser heat exchanger.

23. An air conditioning system for conditioning supply air conducted to an enclosed space comprising:
a refrigerant fluid circuit including a condenser heat exchanger and an evaporator heat exchanger operably connected for circulating a refrigerant fluid;
a supply air reheat heat exchanger disposed downstream of said evaporator heat exchanger with respect to the direction of supply air flow through said evaporator heat exchanger and said reheat heat exchanger;
a blower for conducting supply air through said evaporator heat exchanger and said reheat heat exchanger to supply conditioned air to said space;
a humidity sensor for sensing the humidity in said enclosed space;

a controller for controlling flow of heat exchange medium through said condenser heat exchanger whereby dehumidification of supply air flowing to said enclosed space may be controlled by the amount of heat exchange carried out by said reheat heat exchanger and said condenser heat exchanger, respectively; and a bypass conduit for bypassing refrigerant fluid in said circuit around said condenser heat exchanger when fluid flow restriction increases as reduced heat exchange takes place therein between said refrigerant fluid and said heat exchange medium.

24. The system set forth in claim 23 including:

a pressure relief valve disposed in said bypass conduit for controlling refrigerant fluid pressure at which refrigerant fluid bypasses said condenser heat exchanger.

25. An air conditioning system for conditioning supply air conducted to an enclosed space comprising:

a refrigerant fluid circuit including a condenser heat exchanger and an evaporator heat exchanger operably connected for circulating a refrigerant fluid;

a supply air reheat heat exchanger disposed downstream of said evaporator heat exchanger with respect to the direction of supply air flow through said evaporator heat exchanger and said reheat heat exchanger;

a further heat exchanger disposed in said refrigerant fluid circuit between said condenser heat exchanger and said evaporator heat exchanger;

a blower for conducting supply air through said evaporator heat exchanger and said reheat heat exchanger to supply conditioned air to said space;

a humidity sensor for sensing the humidity in said enclosed space;

said reheat heat exchanger is in circuit with said further heat exchanger for circulating a fluid therebetween to effect reheat of supply air to control humidity in said space; and a controller for controlling flow of heat exchange medium through said condenser heat exchanger whereby dehumidification of supply air flowing to said enclosed space may be controlled by the amount of heat exchange carried out by said reheat heat exchanger and said condenser heat exchanger, respectively.

26. An air conditioning system for conditioning supply air conducted to an enclosed space comprising:

a refrigerant fluid circuit including a condenser heat exchanger and an evaporator heat exchanger operably connected for circulating a refrigerant fluid;

a supply air reheat heat exchanger disposed downstream of said evaporator heat exchanger with respect to the direction of supply air flow through said evaporator heat exchanger and said reheat heat exchanger;

a refrigerant fluid charge compensator operably connected to said refrigerant fluid circuit for storing a portion of said refrigerant fluid;

a blower for conducting supply air through said evaporator heat exchanger and said reheat heat exchanger to supply conditioned air to said space;

a humidity sensor for sensing the humidity in said enclosed space; and a controller for controlling flow of heat exchange medium through said condenser heat exchanger whereby dehumidification of supply air flowing to said enclosed space may be controlled by the amount of heat exchange carried out by said reheat heat exchanger and said condenser heat exchanger, respectively.

27. An air conditioning system for controlling the temperature and humidity of supply air furnished to an enclosed space, said system comprising:

a refrigerant fluid circuit including a compressor operable to compress refrigerant fluid vapor and operable to be connected to a condenser heat exchanger, a reheat heat exchanger and an evaporator heat exchanger for circulating refrigerant fluid therethrough;

a supply air blower for conducting supply air through said evaporator heat exchanger and said reheat heat exchanger to said enclosed space;

a fan for conducting a controlled amount of ambient outdoor air over said condenser heat exchanger;

a fan motor drivably connected to said fan for controlling the flow of air over said condenser heat exchanger;

control valves for selectively controlling flow of refrigerant fluid through said reheat heat exchanger;

temperature and humidity sensors for sensing the temperature and humidity of air in said enclosed space;

a controller operably connected to said compressor and said fan for causing refrigerant fluid to flow through said condenser heat exchanger and said evaporator heat exchanger, for actuating said control valves to selectively control flow of refrigerant fluid through said reheat heat exchanger and for controlling flow of air over said condenser heat exchanger to selectively control the temperature and humidity in said enclosed space; and said compressor, said condenser heat exchanger, said fan and said fan motor comprise an outdoor portion of said system and said system may be provided by replacing an indoor portion of a prior system without replacing, adding or deleting a portion of said refrigerant fluid circuit that extends between an indoor portion of said system and said outdoor portion of said system.

28. An air conditioning system for conditioning supply air conducted to an enclosed space comprising:

a refrigerant fluid circuit including a condenser heat exchanger and an evaporator heat exchanger operably connected for circulating a refrigerant fluid;

a supply air reheat heat exchanger disposed downstream of said evaporator heat exchanger with respect to the direction of supply air flow through said evaporator heat exchanger and said reheat heat exchanger;

a control valve for selectively controlling refrigerant fluid to flow directly from said condenser heat exchanger to said evaporator heat exchanger and from said condenser heat exchanger to said reheat heat exchanger and then to said evaporator heat exchanger;

a blower for conducting supply air through said system including through said evaporator heat exchanger and then through said reheat heat exchanger to supply conditioned air to said space;

a damper disposed downstream of said blower in the direction of flow of supply air through said system and operable for controlling the flow of at least a portion of said supply air to bypass said evaporator heat exchanger and said reheat heat exchanger; and a controller operably connected to an actuator for said damper for selectively controlling the amount of supply air to bypass said evaporator heat exchanger and said reheat heat exchanger.

29. An air conditioning system for conditioning supply air conducted to an enclosed space comprising:

a refrigerant fluid circuit including a condenser heat exchanger and an evaporator heat exchanger operably connected for circulating a refrigerant fluid;

a supply air reheat heat exchanger disposed downstream of said evaporator heat exchanger with respect to the direction of supply air flow through said evaporator heat exchanger and said reheat heat exchanger;

a further heat exchanger disposed in said refrigerant fluid circuit between said condenser heat exchanger and said evaporator heat exchanger;

a blower for conducting supply air through said evaporator heat exchanger and said reheat heat exchanger to supply conditioned air to said space;

a humidity sensor for sensing the humidity in said enclosed space;

said reheat heat exchanger is connected in a heat exchange fluid circuit with said further heat exchanger for circulating a heat exchange fluid therebetween to effect reheat of supply air to control humidity in said space;

a control valve interposed in said heat exchange fluid circuit; and a controller for actuating said control valve to control the flow of said heat exchange fluid whereby dehumidification of supply air flowing to said enclosed space may be controlled by the amount of heat exchange carried out by said reheat heat exchanger and said evaporator heat exchanger, respectively.

* * * * *